United States Patent
Kouno

(10) Patent No.: US 7,990,552 B2
(45) Date of Patent: *Aug. 2, 2011

(54) IMAGE FORMING SYSTEM AND METHOD OF CONTROLLING IMAGE FORMING APPARATUS

(75) Inventor: Mitsuaki Kouno, Funabashi (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 12/392,910

(22) Filed: Feb. 25, 2009

(65) Prior Publication Data

US 2009/0153894 A1 Jun. 18, 2009

Related U.S. Application Data

(63) Continuation of application No. 10/865,550, filed on Jun. 9, 2004, now Pat. No. 7,499,187.

(30) Foreign Application Priority Data

Jul. 8, 2003 (JP) ................................. 2003-193817

(51) Int. Cl.
*G06F 15/00* (2006.01)
*G06F 3/12* (2006.01)
*G06K 1/00* (2006.01)

(52) U.S. Cl. ...................................... 358/1.13; 358/1.15
(58) Field of Classification Search ................. 358/1.13, 358/1.1, 1.14, 1.15
See application file for complete search history.

(56) References Cited

U.S. PATENT DOCUMENTS 6,738,841 B1 * 5/2004 Wolff .............................. 710/62
7,212,980 B2 * 5/2007 Nakamura et al. ............. 705/1.1

FOREIGN PATENT DOCUMENTS

| JP | 2002-182762 | 6/2002 |
| JP | 2002-287842 | 10/2002 |
| JP | 2002-366245 | 12/2002 |
| JP | 2001-309099 | 11/2007 |

OTHER PUBLICATIONS

Japanese Patent Office, Notification of Reasons for Rejection in Application No. 2003-193817, Examiners Notice dated Jan. 23, 2008.

* cited by examiner

*Primary Examiner* — Douglas Q Tran
(74) *Attorney, Agent, or Firm* — SoCal IP Law Group LLP; Steven C. Sereboff; John E. Gunther

(57) ABSTRACT

A trial mode in which the number of trials is limited can be set for a network printer function and a network scanner function of an image forming apparatus. Then, the use of one of the network printer function and network scanner function of the image forming apparatus for which the trial mode has been set is permitted in accordance with a use request from a user.

17 Claims, 4 Drawing Sheets

IMAGE FORMING SYSTEM AND METHOD OF CONTROLLING IMAGE FORMING APPARATUS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from the following prior-filed copending non-provisional patent applications: application Ser. No. 10/865,550, entitled "Image Forming System and Method of Controlling Image Forming Apparatus", filed Jun. 9, 2004 which claims the benefit of priority from prior Japanese Patent Application No. 2003-193817, filed Jul. 8, 2003, the entire contents of which are incorporated herein by reference.

BACKGROUND OF THE INVENTION

1. Field of the Invention

The present invention relates to an image forming system comprising a composite image forming apparatus having a plurality of functions, and a method of controlling the image forming apparatus.

2. Description of the Related Art

A composite image forming apparatus (also referred to as MFP) is known which has not only a normal copy function but also several other functions such as a network scanner function to transmit an image read by a scanner to external equipment by attaching the image to an e-mail and a network printer function to print out an image in accordance with an externally inputted image signal.

The copy function is standard and can be immediately used. The network scanner function and the network printer function may be optional and be permitted to be used on condition that a user purchases them as required.

However, the option functions may be rarely used after purchase. In this case, the cost of these functions may be a waste.

BRIEF SUMMARY OF THE INVENTION

It is an object of the present invention to provide an image forming system that allows a user to try the user's desired function and usefully and handily use the desired function on the basis of the trial, as well as a method of controlling an image forming apparatus.

The image forming system according to the present invention comprises:

a composite image forming apparatus having a plurality of functions;

a setting section which sets a trial mode in which at least either the number of trials or the number of days for the trials is limited, for one of the functions of the image forming apparatus which are requested to be tried; and a permitting section which permits the use of the one of the functions of the image forming apparatus for which the trial mode has been set, in accordance with a use request.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the present invention will be described below with reference to the drawings.

Figure 1:
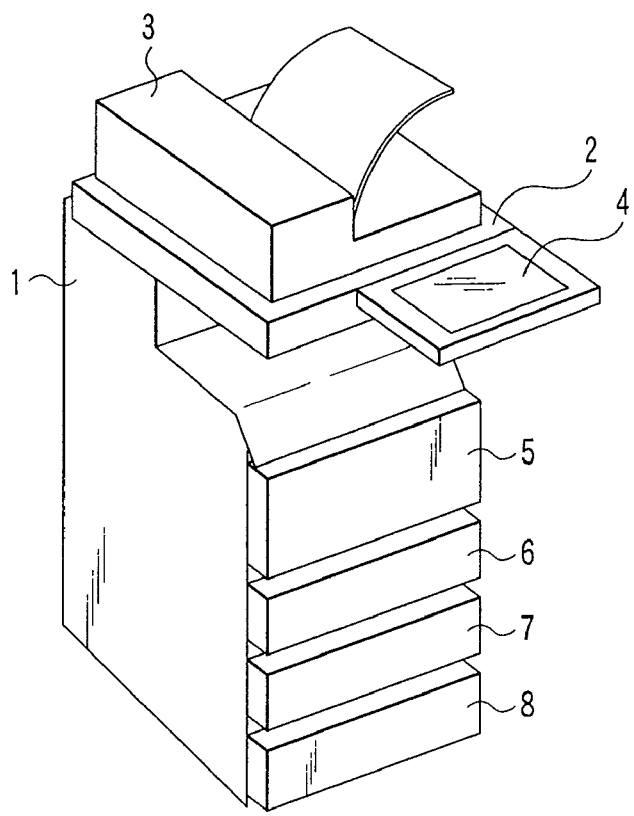
FIG. 1 is a perspective view showing the appearance of an image forming apparatus according to an embodiment of the present invention.

FIG. 1 shows a composite image forming apparatus according to the present invention. An image forming apparatus 1 has a copy function, a network printer function, and a network scanner function. The copy function is standard and can be immediately used. The network printer function and the network scanner function are optional and are permitted to be used on condition that a user of the image forming apparatus 1 purchases them as required.

Figure 2:
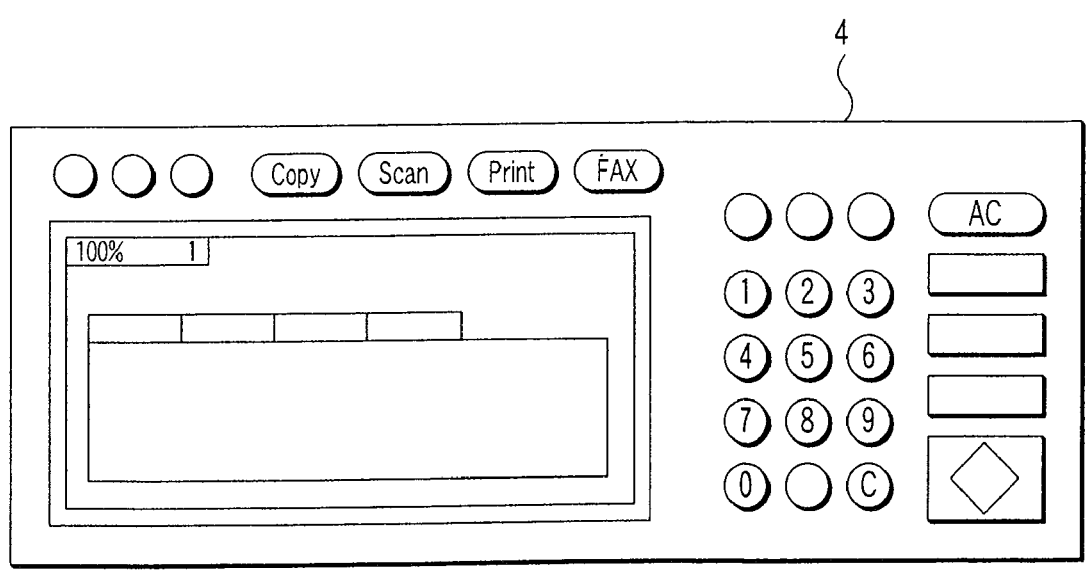
FIG. 2 is a view showing the configuration of a control panel according to this embodiment.

The image forming apparatus 1 has a copy board 2 on its top surface. An automatic document feeder (ADF) 3 including a sheet discharge tray is provided on the copy board 2 so as to be opened and closed. A control panel 4 is provided at the same height as that of the copy board as operation means for setting operational conditions. FIG. 2 shows a specific example of the control panel 4.

The image forming apparatus 1 is provided with cassettes 5, 6, 7, and 8 in its lower part in which paper sheets of various sizes are accommodated.

Figure 3:
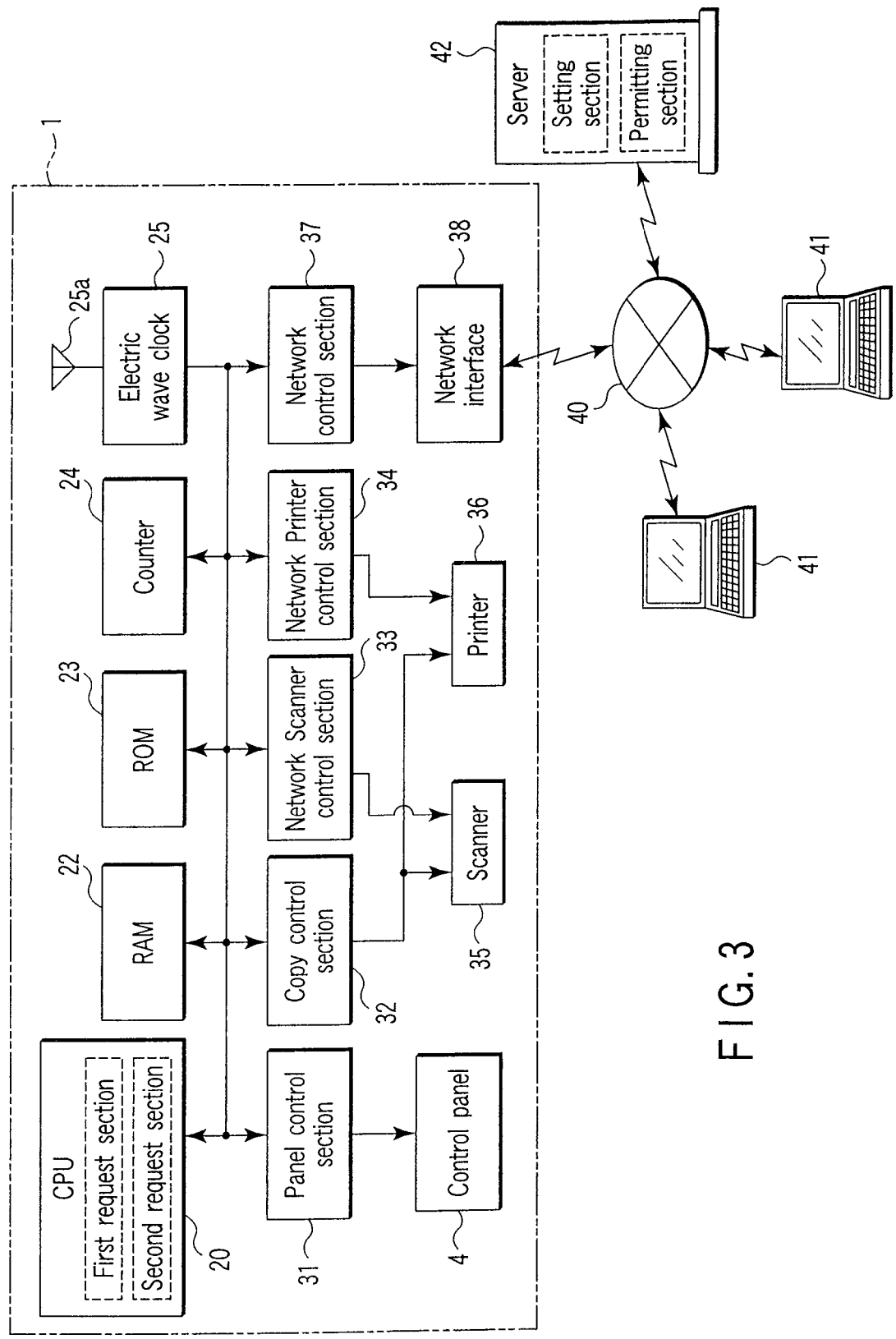
FIG. 3 is a block diagram of a control circuit according to this embodiment.

FIG. 3 shows a control circuit in the image forming apparatus 1.

A CPU 20 as a control center connects to a RAM 22, a ROM 23, a counter 24, an electric wave clock 25, a panel control section 31, a copy control section 32, a network scanner control section 33, a network printer control section 34, and a network control section 37.

The RAM 22 stores the set number N of trials for the number P of prints described later, the set number S of trials for the number L of scans described later, and the like. The RAM 22 stores various programs downloaded from a server 42 described later. The ROM 23 stores various control programs required for operations of the image forming apparatus 1. If a trial mode described later is set, the counter 24 counts the number P of prints and the number L of scans. The electric wave clock 25 also comprises an antenna 25*a* and clocks the current time, while sequentially updating the current time by receiving a standard time electric wave.

The panel control section 31 controls the control panel 4. The copy control section 32 controls the scanner 35 and the printer 35 for the copy function. The network scanner control section 33 controls the scanner 35 for the network scanner function. The network printer control section 34 controls the printer 36 for the network printer function (including a FAX function).

The network control section 37 controls external data transmissions and receptions via the network interface 38. The network interface 38 includes a LAN board and a FAX modem. The network interface 38 is connected to user terminals, for example, a large number of personal computers 41, 41, ..., 41 via a communication network line 40 such as a LAN or the Internet and to at least one server 42. The server 42 is installed in a management center (not shown) or the like located in an area which is different from the area in which the image forming apparatus 1 is installed.

The CPU 20 has means (1) and (2) as its main functions.

(1) First request section that requests a trial of either the network printer function or network scanner function of the image forming apparatus 1 in response to an operation of either the control panel 4 or personal computer 41 performed by a service person or user who was present at the installation of the image forming apparatus 1.

(2) Second request section that request, of the server 42, the use of a function for which a trial mode described later has been set, in response to an operation of either the control panel 4 or personal computer 41 performed by the user.

On the other hand, the server 42 is installed in the management center (not shown) or the like located in an area which is different from the area in which the image forming apparatus 1 is installed. The server 42 stores programs required for operations and various expansion functions of the image forming apparatus. The server 42 has means (11) and (12) as its main functions.

(11) Setting section that sets the trial mode in which the number of trials (or the number of days for the trials) is limited, for either the network scanner function or network printer function which is requested by the first request section to be tried.

(12) Permitting section that permits the use (also referred to as a purchase request) of either the network scanner function or network printer function for which the trial mode has been set, in response to a use request from the second request section.

Figure 4:
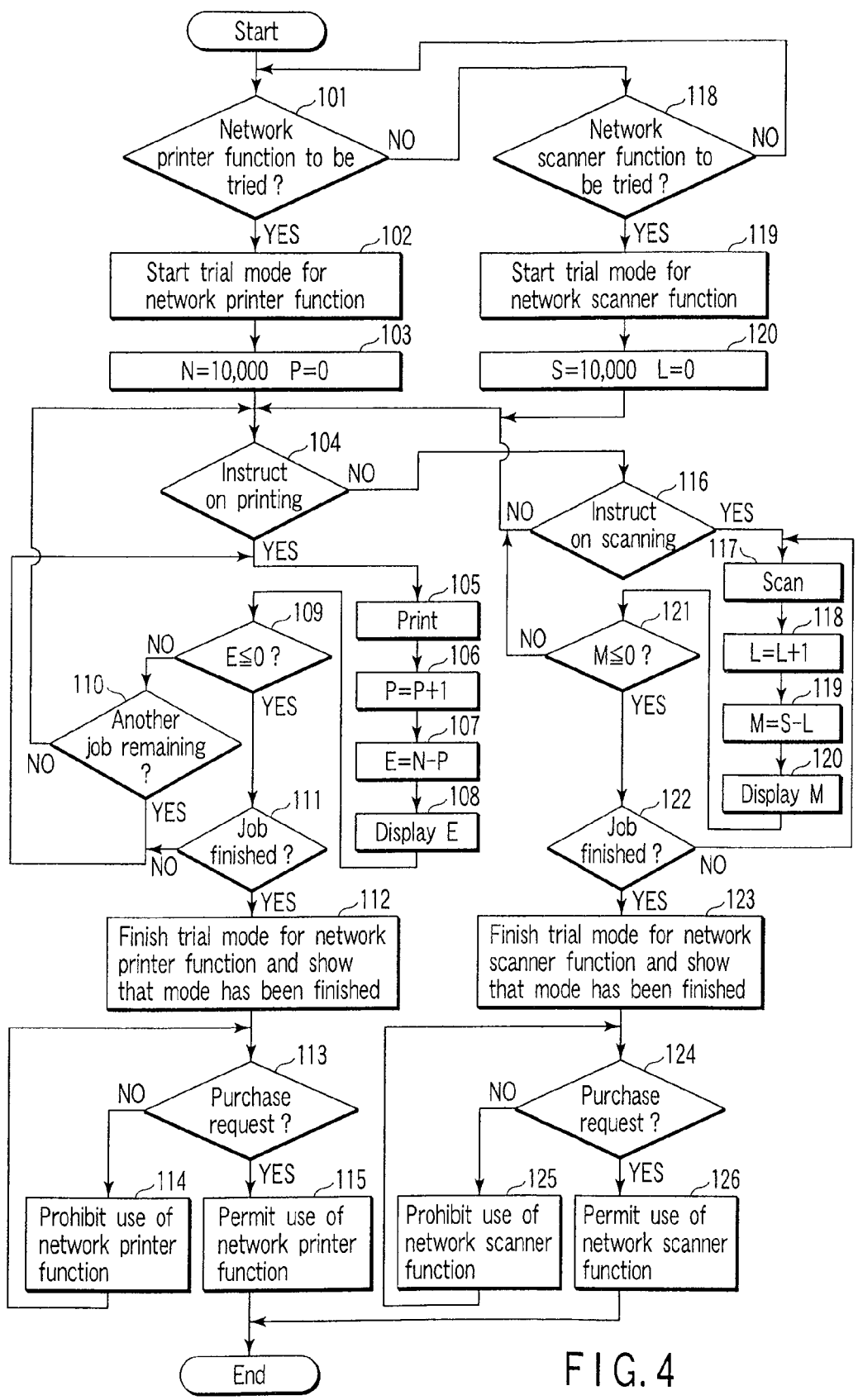
FIG. 4 is a flow chart illustrating operations of this embodiment.
Figure 5:
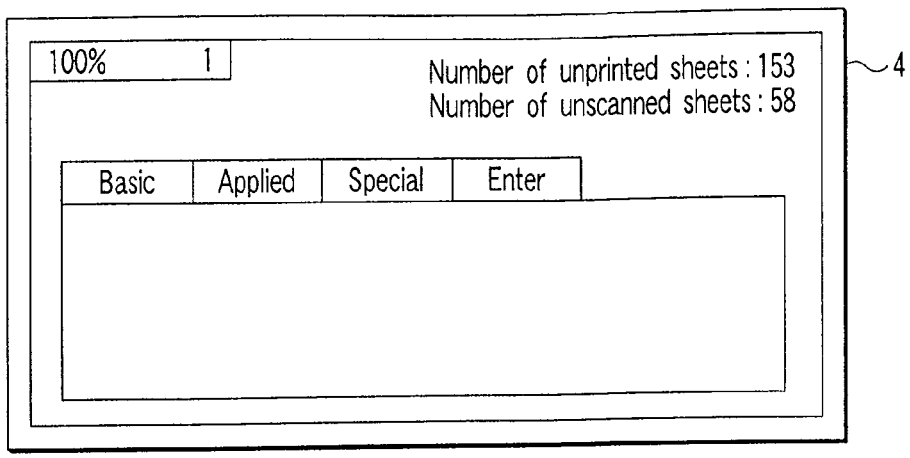
FIG. 5 is a view showing an example of display on a control panel according to this embodiment.

Now, operations of the above configuration will be described with reference to the flow chart in FIG. 4.

After the image forming apparatus 1 has been installed, the service person or user who was present at the installation operates either the control panel 4 or personal computer 41 to request a trial of the network printer function (YES in a step 101). Then, the request is sent to the server 42 via the communication network line 40. In response to the request for a trial, the server 42 instructs the image forming apparatus 1 to set the trial mode for the network print function. In response to this instruction, the image forming apparatus 1 starts the trial mode for the network printer function (step 102). Then, the set number N of trials (number of sheets for trials) of network prints is set at, for example, "10,000". The number P of prints (number of sheets for prints) in the counter 24 is initialized to "0" (step 103).

Subsequently, a print instruction is inputted from the personal computer 41 to the image forming apparatus 1 via the communication network line 40 (YES in a step 104). Then, the printer 36 executes printing in accordance with an image signal inputted by the personal computer 41 (step 105). In association with the printing, the number P of prints in the counter 24 is incremented by "1" (step 106). The number P of prints incremented by "1" is subtracted from the set number N of trials to determine the number E of remaining trials (step 107). The determined number E of remaining trials is displayed in a free display area of the control panel 4 as "number of unprinted sheets:" (step 108). The user can view this display to determine the number E of remaining trials of network prints.

Before the number E of remaining trials of network prints becomes "0" (NO in a step 109) and if the print instruction contains a plurality of print jobs, the processing from step 105 to step 108 is repeated until all the print jobs are finished (YES in a step 110).

Even when the number E of remaining trials becomes "0" (YES in a step 109), if not all the print jobs have been finished (NO in a step 111), the processing from step 105 to step 108 is repeated.

Figure 6:
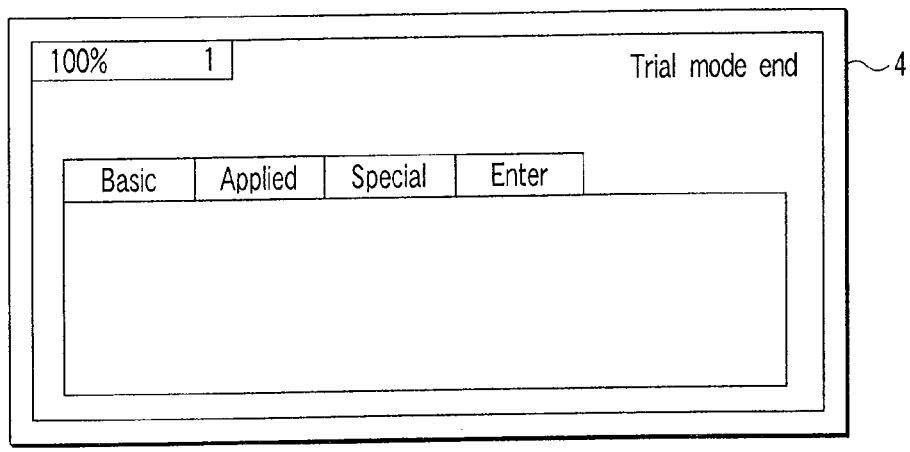
FIG. 6 is a view showing another example of display on the control panel according to this embodiment.

Once the number E of remaining trials becomes "0" or smaller (YES in the step 109) and all the print jobs have been finished (YES in the step 111), the trial mode for the network printer function is finished. At the same time, the characters "trial mode end" are displayed in the free display area of the control panel 4 as shown in FIG. 6 (step 112).

After the trial mode for the network printer function has been finished, provided that no purchase requests (use requests) are inputted from the control panel 4 or the personal computer 41 (NO in a step 113), the use of the network printer function is immediately prohibited (step 114).

After the trial mode for the network printer function has been finished, if the user desires to use the network printer function, the use inputs a purchase request (use request) from either the control panel 4 or personal computer 41 (YES in the step 113). This input data is sent to the server 42 via the communication network line 40. In response to this input, the server 42 issues data for permitting the use of the network printer function, for example, a password. The server 42 then sends the password to the image forming apparatus 1 or personal computer 41 from which the purchase request has been inputted. The password sent to the image forming apparatus 1 is displayed on the control panel 4 and provided to the user. The password sent to the personal computer 41 is displayed on a display of the personal computer 41 and provided to the user.

Subsequently, every time the password provided to the user is inputted from either the control panel 4 or the personal computer 41, the use of the network printer function of the image forming apparatus 1 is permitted (step 115).

On the other hand, the service person or user who was present at the installation operates either the control panel 4 or personal computer 41 to request a trial of the network scanner function (YES in a step 118). Then, the request is sent to the server 42 via the communication network line 40. In response to the request for a trial, the server 42 instructs the image forming apparatus 1 to set the trial mode for the network scanner function. In response to this instruction, the image forming apparatus 1 starts the trial mode for the network scanner function (step 119). Then, the set number S of trials (set number of sheets for trials) of network scans is set at, for example, "10,000". The number L of scans (number of sheets for scans) in the counter 24 is initialized to "0" (step 120).

Subsequently, a scan instruction is inputted from the personal computer 41 to the image forming apparatus 1 via the communication network line 40 (YES in a step 116). Then, the scanner 35 executes scanning to read an image from a document placed on the copy board 2 (step 117). The CPU 20 then generates an e-mail to which this read image is attached. The generated e-mail is sent to the personal computer 41 via the communication network line 40. This is what is called Scan To Email.

In association with the network scan, the number L of scan in the counter 24 is incremented by "1" (step 118). The number L of scans incremented by "1" is subtracted from the set number S of trials to determine the number M of remaining trials (step 119). The determined number M of remaining trials is displayed in a free display area of the control panel 4 as "number of unscanned sheets:" (step 120). The user can view this display to determine the number M of remaining trials of network scans.

Even when the number M of trials of network scans becomes "0" (YES in a step 121), if not all the scan jobs have been finished (NO in a step 122), the processing from step 117 to step 120 is repeated.

Once the number M of remaining trials of network scans becomes "0" or smaller (YES in the step 121) and all the print jobs have been finished (YES in the step 122), the trial mode for the network scanner function is finished. At the same time, the characters "trial mode end" are displayed in the free display area of the control panel 4 as shown in FIG. 6 (step 123).

After the trial mode for the network scanner function has been finished, provided that no purchase requests (use requests) are inputted from the control panel 4 or the personal computer 41 (NO in a step 124), the use of the network scanner function is immediately prohibited (step 125).

After the trial mode for the network scanner function has been finished, if the user desires to use the network scanner function, the user inputs a purchase request (use request) from either the control panel 4 or personal computer 41 (YES in the step 124). This input data is sent from the image forming apparatus 1 to the server 42 via the communication network line 40. In response to this input, the server 42 issues data for permitting the use of the network scanner function, for example, a password. The server 42 then sends the password to the image forming apparatus 1 or personal computer 41 from which the purchase request has been inputted. The password sent to the image forming apparatus 1 is displayed on the control panel 4 and provided to the user. The password sent to the personal computer 41 is displayed on a display of the personal computer 41 and provided to the user.

Subsequently, every time the password provided to the user is inputted from either the control panel 4 or the personal computer 41, the use of the network printer function of the image forming apparatus 1 is permitted (step 126).

If the user inputs a purchase request during the trial mode for the network printer function or network scanner function, then at that point, the server 42 issues a password for permitting the use.

As described above, the apparatus comprises not only the copy function, which is standard and can be immediately used, but also the network scanner function and network printer function, which are optional. Thus, the user can try the network scanner function and the network printer function. Consequently, the user can adequately recognize through his or her own experience whether or not each of the function is required. Then, only if the user desires to purchase (use) any function, the server 42 permits the use of that function. This prevents a distributor or manufacture providing the image forming apparatus 1 from inflicting a loss and allows it to do an efficient business. This system is economical to the user because he or she need not pay any fees for unwanted functions.

It is possible to download arbitrary programs from the server 42 into the image forming apparatus 1. This enables various expansion functions desired by the user to be mounted in the image forming apparatus 1.

In the described example, control programs for the network printer function and network scanner function are pre-stored in the image forming apparatus 1. However, the control programs may be downloaded from the server 42 into the image forming apparatus 1 as required.

Figure 7:
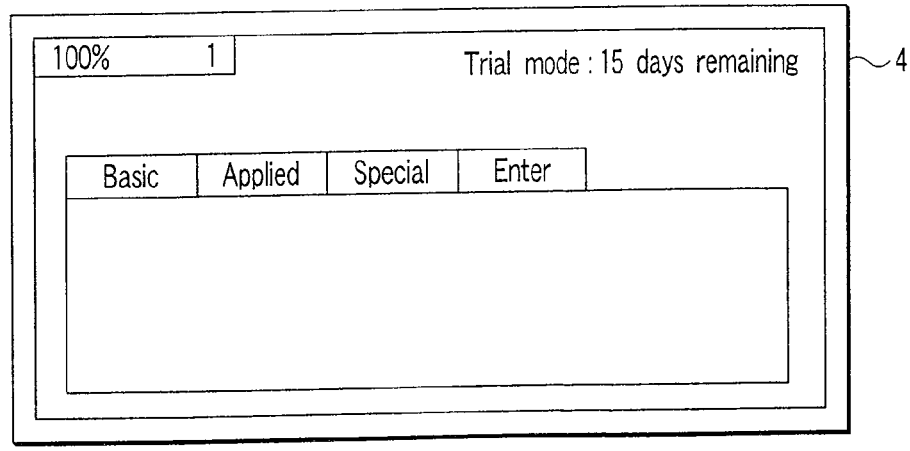
FIG. 7 is a view showing an example of display on the control panel according to a variation of this embodiment.

In the above description, the number of trials is set as a limitation on the trial mode. However, time counting based on clocking by the electric wave clock may be started simultaneously with the start of the trial mode, so as to set the number of elapsed days based on the time count as a limitation on the trial mode. In this case, as shown in FIG. 7, "trial mode: . . . days remain" is displayed in the free display area of the control panel 4.

Both the number of trials and the number of days for the trials may be set as limitations on the trial mode.

In the above description, the trial mode is set by an instruction given by the server 42 to the image forming apparatus 1. However, once a trial is requested by operating the control panel 4 or the personal computer 41, the trial mode may be set directly for the image forming apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

It is claimed:

1. An image forming apparatus having a plurality of functions, comprising:
    a network interface connected to at least one computer via a communication network;
    a setting section which sets a trial mode in which at least either the number of trials or the number of days for the trials is limited, for one of said plurality of functions in response to an operation of either a control panel of the image forming apparatus or the computer;
    a request section which requests a purchase of the function for which the trial mode has been set by the communication network; and
    a permitting section which permits the use of the function for which the trial mode has been set, in accordance with the purchase request of the request section, and prohibits the use of the function for which the trial mode has been set upon completion of trial mode in a case where the request has not requested the purchase function.

2. An apparatus according to claim 1, wherein the plurality of functions are a copy function, a network printer function for which the trial mode can be set, and a network scanner function for which the trial mode can be set, the network printer function printing out an image in accordance with an externally inputted image signal, and the network scanner function transmitting an image read by the image forming apparatus to external equipment.

3. An apparatus according to claim 1, further comprising
the network interface connected to the computer and a server via the communication network, the server issuing a password for the permission in accordance with the purchase request of the request section.

4. An apparatus according to claim 1, further comprising
a display which displays the number of the remaining trials or the number of remaining days for the trials.

5. An apparatus according to claim 1, wherein
the request section is provided in at least one of the image forming apparatus and the computer.

6. An apparatus according to claim 3, wherein
the setting section is provided in either the image forming apparatus or the server, and
the permitting section is provided in the server.

7. A method of controlling an image forming apparatus having a plurality of functions and including a network interface connected to at least one computer via a communication network, the method comprising:
setting a trial mode in which at least either a number of trials or a number of days for the trials is limited, for one of said plurality of functions in response to an operation of either a control panel of the image forming apparatus or the computer;
requesting a purchase of the function for which the trial mode has been set by the communication network;
permitting the use of the function for which the trial mode has been set, in accordance with the purchase request, and prohibiting the use of the function for which the trial mode has been set upon completion of trial mode in a case where there is no purchase request.

8. A method according to claim 7, wherein
the plurality of functions are a copy function, a network printer function for which the trial mode can be set, and a network scanner for which the trial mode can be set, the network printer function printing out an image in accordance with an externally inputted image signal, and the net network scanner function transmitting an image read by the image forming apparatus to external equipment.

9. A method according to claim 7, further comprising
the network interface connected to the computer and a server via the communication network, the server issuing a password for the permission in accordance with the purchase request.

10. A method according to claim 7, further comprising
displaying the number of the remaining trials or the number of remaining days for the trials.

11. A method according to claim 7, wherein
the request section is provided in at least one of the mage forming apparatus and the computer.

12. An image forming apparatus having a plurality of functions, comprising:
a network interface connected to at least one computer via a communication network;
setting means for setting a trial mode in which at least either a number of trials or a number of days for the trials is limited, for one of said plurality of functions in response to an operation of either a control panel of the image forming apparatus of the computer;
requesting means for requesting a purchase of the function for which the trial mode has been set by the communication network;
permitting means for the use of the function for which the trial mode has been set, in accordance with the purchase request of the requesting means, and prohibiting the use of the function for which the trial mode has been set upon completion of trial mode in a case where the requesting means has not requested the purchase of the function.

13. An apparatus according to claim 12, wherein
the plurality for functions are a copy function, a network printer function for which the trial mode can be set, and a network scanner function for which the trial mode can be set, the network printer function printing out an image in accordance with an externally inputted image signal, and the network scanner transmitting am image read by the image forming apparatus to external equipment.

14. An apparatus according to claim 12, further comprising
the network interface connected to the computer and a server via the communication network, the server issuing a password for the permission in accordance with the purchase request from the requesting means.

15. An apparatus according to claim 12, further comprising
displaying means for displaying the number of the remaining trials or the number of remaining days for the trials.

16. An apparatus according to claim 12, wherein
the requesting means is provided in at least one of the image forming apparatus and the computer.

17. An apparatus according to claim 14, wherein
the setting means is provided in either the image forming apparatus or the server, and
the permitting means is provided in the server.

* * * * *